Figure 4:
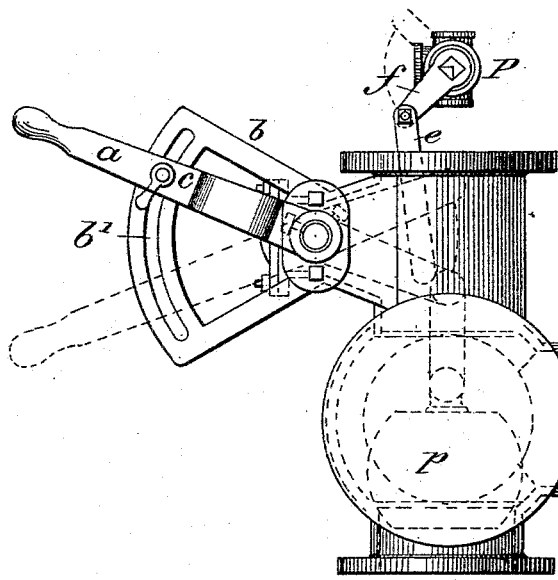

(No Model.) 3 Sheets—Sheet 1.
H. C. SHIELDS.
APPARATUS FOR THE MANUFACTURE OF GAS.
No. 399,087. Patented Mar. 5, 1889.
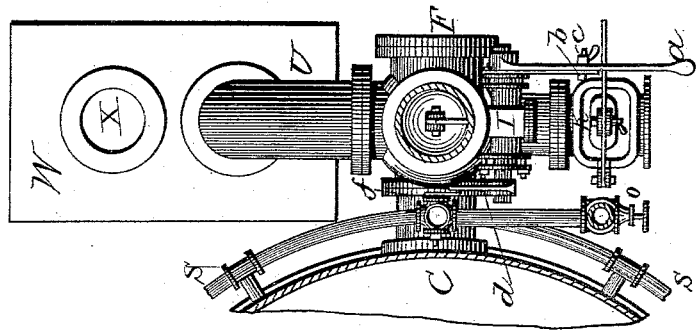
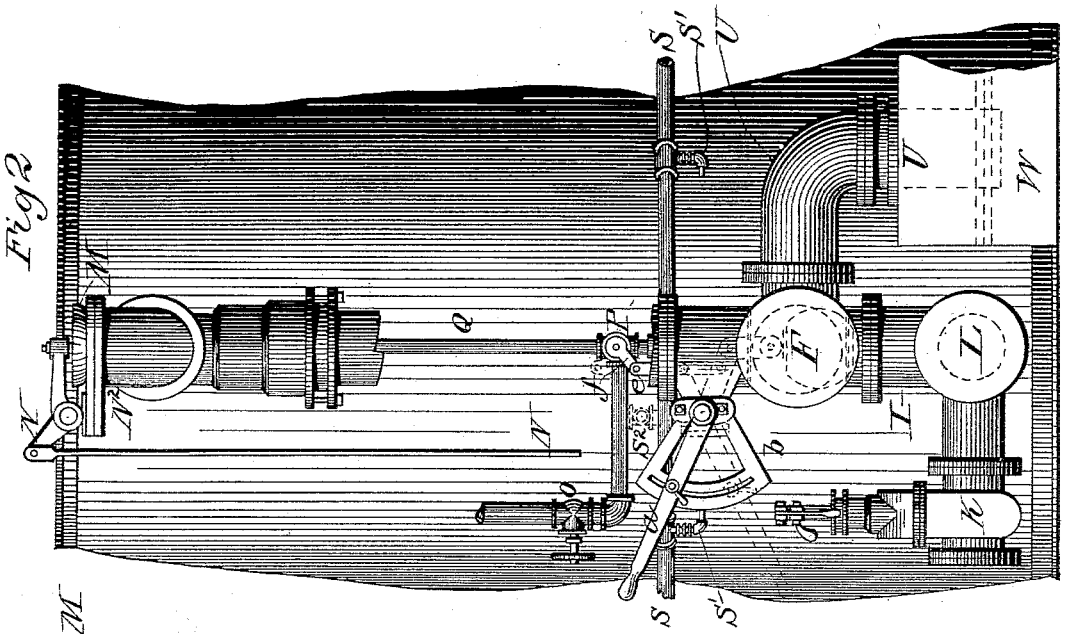
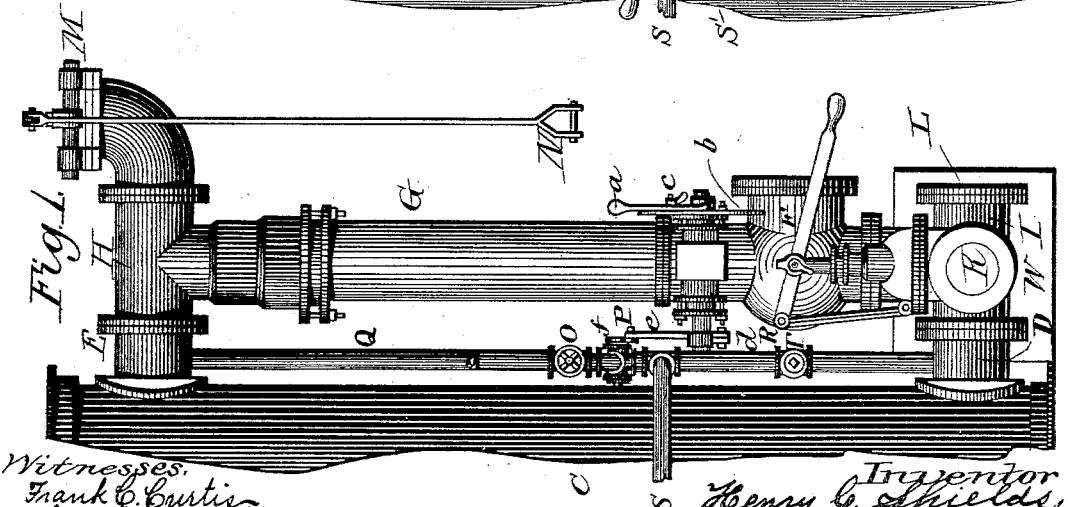
Witnesses:
Frank C. Curtis
John T. Booth
Inventor
Henry C. Shields
by Geo. A. Mosher
atty.

(No Model.) 3 Sheets—Sheet 2.

H. C. SHIELDS.
APPARATUS FOR THE MANUFACTURE OF GAS.

No. 399,087. Patented Mar. 5, 1889.

Witnesses:
Frank C. Curtis
John T. Booth

Inventor:
Henry C. Shields
by Geo. A. Mosher
atty.

(No Model.) 3 Sheets—Sheet 3.
H. C. SHIELDS.
APPARATUS FOR THE MANUFACTURE OF GAS.
No. 399,087. Patented Mar. 5, 1889.
Fig. 9.
Fig. 10.
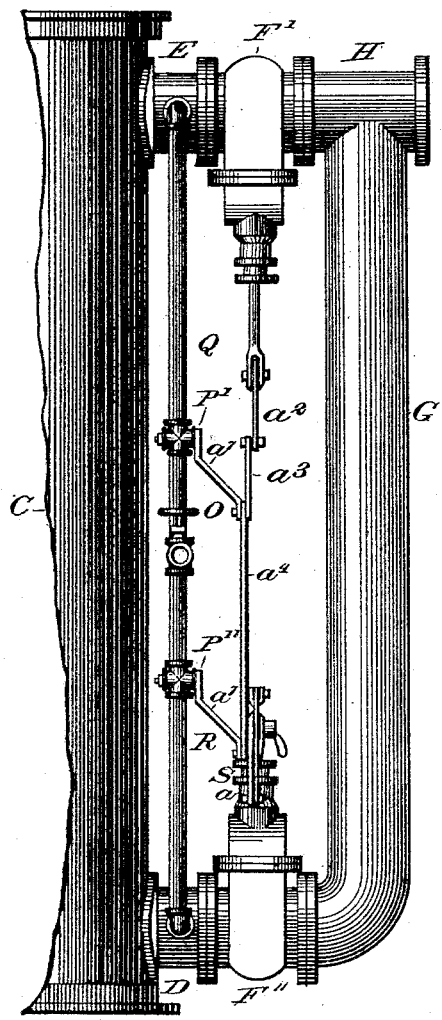
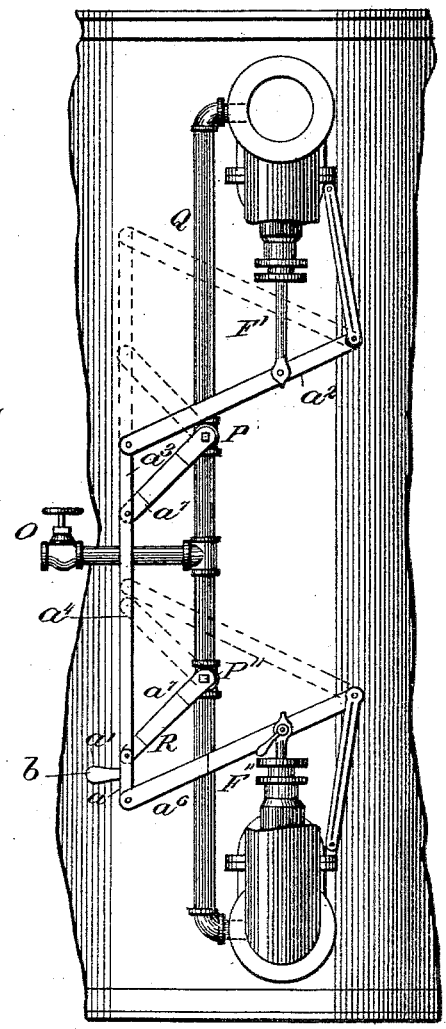
Witnesses:
Frank C. Curtis
John T. Booth
Inventor:
Henry C. Shields
by Geo. A. Mosby
atty.

UNITED STATES PATENT OFFICE.

HENRY C. SHIELDS, OF TROY, NEW YORK.

APPARATUS FOR THE MANUFACTURE OF GAS.

SPECIFICATION forming part of Letters Patent No. 399,087, dated March 5, 1889.

Application filed December 16, 1887. Serial No. 258,080. (No model.)

*To all whom it may concern:*

Be it known that I, HENRY C. SHIELDS, a resident of the city of Troy, in the county of Rensselaer and State of New York, have invented certain new and useful Improvements in Apparatus for the Manufacture of Gas; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in apparatus for the manufacture of heating and illuminating gas; and it consists of the novel construction and combination of parts hereinafter described, and pointed out in the claims.

The invention which forms the subject of this application may be regarded as an improvement upon the apparatus shown and described in United States Letters Patent No. 259,723, issued to me June 20, 1882, for improvements in the "Process of and apparatus for producing illuminating and heating gas," to which reference may be had. The objection to the process of reversing the currents of steam and gas in a gas-generator has been heretofore the complication of valves required to accomplish such reversal, which rendered the gas-maker liable to errors in operating the valves, which might result in an explosion within the generator. For instance, after having admitted steam at the top of the generator and taken gas out of the bottom an explosion would probably follow when the air-blast was admitted to reheat the fuel, unless the gas that remained in the bottom of the generator was first driven out by the introduction of steam.

The objects of my invention are to overcome the danger of explosion in the generator and the danger of losing a "run" by mistakes in opening the upper steam-inlet and gas-outlet or the lower steam-inlet and gas-outlet valves, which would allow the steam to escape without passing through the incandescent fuel, and to simplify and render more efficient and durable the means for reversing the currents of steam and gas in the generator, and provide a valve which can be exposed to excessive heat without injury to its effectiveness as a valve.

Figure 6:
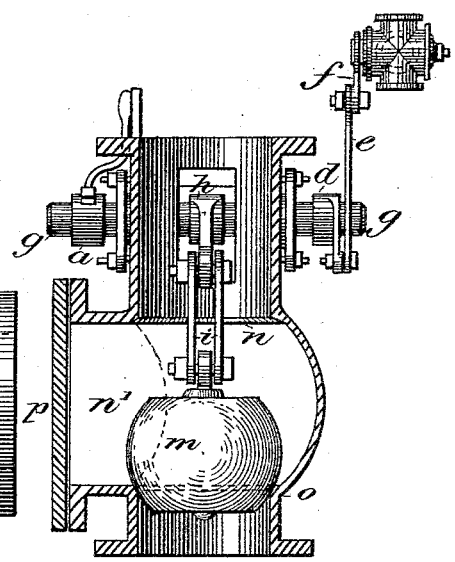
Figure 5:
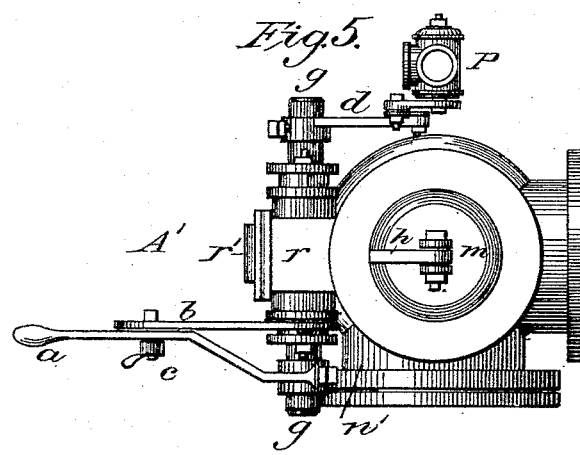
Figures 7, 8:
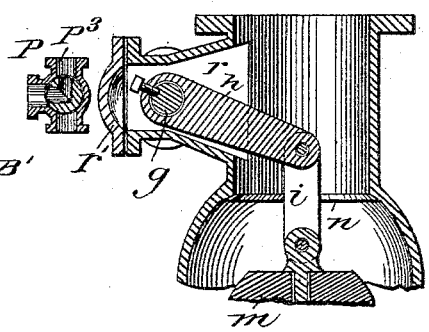

Figure 1 of the drawings represents, in front elevation, gas, steam, and blast pipes and valve and part of the shell of a gas-generator of the usual internal construction. Fig. 2 represents a side elevation of same. Fig. 3 represents a plan view of same, partly in horizontal section, taken on broken line A B in Fig. 1. Fig. 4 represents a side elevation of double gas-valve connected with a two-way cock, the valve and cock being shown detached. Fig. 5 represents a plan view of same. Fig. 6 represents a vertical section of the valve shell or case, the other parts being shown in elevation. Fig. 7 represents a horizontal section of the two-way steam-cock. Fig. 8 represents a vertical section of the parts shown in Fig. 5, taken on the lines A' B'. Figs. 9 and 10 are respectively side and front elevations showing modified forms of my invention.

In Fig. 1, C is the shell of the generator; D, the lower gas-outlet and steam and air-blast inlet. I is a T which connects the same to the double valve F. Said T is provided with a removable plate, L, for cleaning the same; also, with a side inlet-pipe, to which is attached the blast-valve K.

E is the upper gas-outlet and steam-inlet, and also serves as the outlet for the products of combustion.

H is a T provided with an expansion-joint at its lower end, which receives the end of pipe G and forms the connection with double valve F. The outlet of the double valve is connected with dip-pipe V in seal W by the elbow U.

M is the escape-valve, and is operated by means of handle N, connected with lever N', pivoted at N².

O is a steam-valve and is connected to two-way cock P, the upper outlet of which is connected by means of pipe Q to pipe E, and the lower outlet of which is connected to pipe D by means of pipe R, and also to circular pipe S, extending around the generator and shown in part only. The circular or runaround pipe S is connected into the sides of the generator at frequent intervals just above the grate, the connections being provided with valves or cocks S' to regulate the flow of steam into the generator.

T is a steam-cock in pipe R below the run-around pipe.

The valve case or shell of the double valve F is made of cast-iron or other suitable material in the form of a T, with a side opening, N', for the admission of the valve $m$. At the intersection of the center line of the pipes forming the T the case is enlarged or bulged outward, so as to get the full area of the pipes when the valve $m$ is in position, as shown in Fig. 6, $m'$ representing the bulge. The valve has an upper seat, $n$, and lower seat, $o$. The valve $m$ is made of cast-iron in the form of a ball with the upper and lower parts cut off, as shown in Fig. 6, and is lathe-turned, so as to make a gas-tight joint with the turned seats $n$ or $o$. On the front of the pipe which forms the upper inlet of the valve there is a projecting box or chamber, $r$, which incloses the valve-actuating lift-arm or lever $h$, and through which passes the shaft $g$, to which lever $h$ is secured by means of pin or set-screw.

The box may have an exterior opening on its projecting end for the insertion or removal of the valve-actuating parts into or from the laterally-projecting chamber, which opening is shown covered by plate $r'$. The sides of the chamber inclosure may be provided with stuffing-boxes to receive the shaft $g$. The lever $h$ is connected to the eyebolt in valve $m$ by links $i$ $i$. The bolts through the links should have sufficient play to allow the valve to hang plumb when being changed from one seat to the other. A lever-arm, $d$, fixed upon a projecting end of shaft $g$, is connected by link $e$ to the cock-wrench $f$. Shaft $g$ is also provided with an operating-handle, $a$, fixed thereon. A lock-frame, $b$, is attached to the valve-case and is provided with a segmental slot, $b'$, adapted to contain a follower secured to the handle $a$, having a locking-wrench, $c$. The shell or case of steam-cock $p$ is of the usual construction; but the plug or valve $p^3$ has only two passages instead of three, as shown in Fig. 7.

When the lever $a$ is in the position shown in Fig. 4, the valve $m$ is in the lower seat, $o$, and the plug in steam-cock $p$ is in a proper position to admit steam to the lower part of the generator, while the gas escapes from the upper part of the generator.

When lever $a$ is in the position shown by dotted lines in Fig. 4, valve $m$ occupies the upper seat, $n$, to which seat it has been carried by the handle $a$, shaft $g$, actuating-lever $h$, and links $i$, the plug in the steam-cock $p$ being reversed at the same time by means of shaft $g$, arm $d$, link $e$, and cock-wrench $f$ to admit steam at the upper part of the generator and a consequent escape of gas from lower part of the same.

The operation of my improved apparatus is as follows: When the generator is in condition to receive the air-blast, the escape-valve M is opened and steam admitted for an instant through valve O and lower pipe, D, to purge the bottom of the generator of any gas that might be present. Steam-valve O is then closed and blast-valve K opened, admitting air to the bottom of generator, the products of combustion escaping through open valve M. After the fuel in the generator has been sufficiently heated the blast-valve is closed and steam-valve O is opened, admitting steam to the bottom of the generator as before, the two-way cock P being in the position shown in Fig. 2 to admit steam through R into the lower pipe, D. Escape-valve M is closed as soon as the products of combustion are driven out, and the gas being produced escapes through pipe E, T H, and pipe G to outlet of double valve F, thence through elbow U, dip-pipe V to seal W, and finally to outlet of seal, where it is taken to the holder or to the point where it is to be used. After the steam has been directed into the bottom of the generator, as above described, for a few seconds it is generally desirable to reverse the direction of the steam-current to the top of the generator and permit the gas to escape from the bottom. This is accomplished by turning down lever $a$ to the position shown by dotted lines in Figs. 2 and 4, where it is locked to frame $b$ by lock-nut $c$, which reverses the position of the gas-valve $m$ and steam-cock valve P', as before described. Steam then enters at the top of the generator through pipes Q and E and the gas escapes through pipe D, T I to the outlet of double valve F, from which it escapes, as before described. Just before the run is finished the lever $a$ is again reversed or thrown back to the position shown by solid lines in Figs. 2 and 4, thus admitting steam again at the bottom of the generator, which drives out the gas and leaves the generator in condition to receive the air-blast as soon as steam-valve O is closed and escape-valve M opened. It will thus be seen that the connection of the reversing steam-cock in the steam-pipe and the double or reversing valve in the gas-pipe with a common operating-handle not only permits great convenience in operating said cock and valve, but renders it impossible to reverse one without at the same time reversing the other.

By reducing the complication of valves the gas-maker is less liable to mistakes, which might result in great damage to property as well as personal injury.

One of the objects of reversing the currents in the generator from one end to the other is to reduce the excessive heat therein and prevent the formation of slag and clinkers. I also make provision for admitting steam at different points through the shell of the generator intermediately of the ends to prevent the formation of clinkers on the linings of the generator, consisting of the runaround pipe S and connections into the generator, before described.

The connections may be provided with cocks or valves S' for adjusting the quantity of steam to be admitted.

When desired, the steam-supply pipe may be connected directly to the runaround pipe, as shown by dotted lines in Fig. 2, the connection being provided with a stop-cock, S², by means of which connection steam may be admitted wholly through the runaround pipe and taken off either at the top or bottom of the generator as gas. The cock T in pipe R is only used when it is desired to adjust the distribution of steam between pipes R and the runaround pipe to force more or less steam in at the sides of the generator, while the main supply passes through the pipe R and inlet D into the bottom of the generator.

In Figs. 9 and 10 I have shown the upper and lower outlet-pipes provided with separate valves, F' and F'', and the steam-supply pipes Q and R each provided with a separate stopcock, P' and P'', and connections therefrom to a common actuating-lever, $a'$. The lever $a^2$, which operates the valve F', is connected by links $a^3$, $a^4$, and $a^5$ with the lever $a^6$, which operates the valve F'', so that when the connecting-links are given a vertical movement by handle $a'$, attached to link $a^5$, the actuating-levers are moved, as shown by dotted lines in Fig. 10, to open one valve and close the other. The cocks P' and P'' are each provided with a cock-wrench, $a^7$, pivoted to the link $a^4$, by which they are opened and closed simultaneously with the valves, the cock P' being closed when the valve F' is opened and the cock P'' being opened when the valve F'' is closed.

Although the arrangement necessitates a greater complication of valves than is required by the use of a single reversing gas-valve and single reversing steam cock or valve hereinbefore described, it nevertheless enables me to reverse the direction of steam entering the generator and the direction of gas escaping therefrom by the movement of one common actuating-lever.

What I claim as new, and desire to secure by Letters Patent, is—

1. In combination with a gas-generator provided with upper and lower gas-outlets and upper and lower steam-supply pipes leading to and connecting with reversing-valves, a valve-reversing lever common to and connected with each of said valves, whereby a single movement of the lever will reverse the direction of steam entering the generator and the direction of gas escaping therefrom, substantially as described, and for the purposes set forth.

2. The combination, with a gas-generator having valved upper and lower gas-outlet pipes and upper and lower valved steam-supply pipes, of a valved runaround steam-supply pipe having connections leading to the interior of the generator through its sides at a plurality of points intermediately of the upper and lower steam-supply-pipe inlets to the generator, substantially as described.

3. A valve-case having interiorly two circular valve-seats, each forming the mouth of one of two inlets to the case, and intermediately of said seats a third opening, which forms the outlet from said case, and a lever-chamber formed by lateral extension of the valve-case, in combination with a valve suspended between and movable from one to the other of said seats, and a valve supporting and actuating lever-arm vertically vibratory in said chamber and fixed upon an actuating-shaft passing through said chamber and projecting exteriorly from the valve-case, substantially as and for the purposes set forth.

4. The combination, with a gas-generator, of upper and lower gas-outlets, valved upper and lower steam-supply pipes, and a single valve-operating lever operative to conversely open and close the valvular openings in said supply-pipes, substantially as described, and for the purposes set forth.

5. The combination, with a gas-generator, of an upper and lower steam-supply pipe, valved upper and lower gas-outlet pipes, and a single valve-operating lever operative to conversely open and close the valvular openings in said outlet-pipes, substantially as described, and for the purposes set forth.

In testimony whereof I have hereunto set my hand this 14th day of December, 1887.

HENRY C. SHIELDS.

Witnesses:
GEO. A. MOSHER,
CHAS. L. ALDEN.